Figure 1:
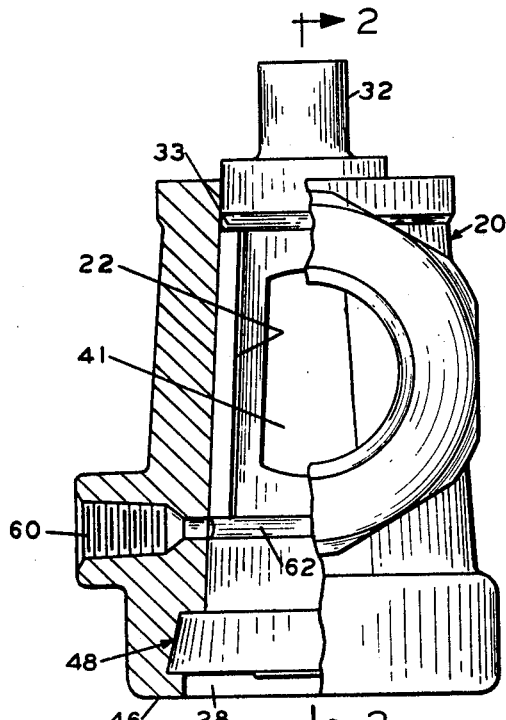

July 16, 1968 C. J. GEYER 3,392,748

TAMPER-PROOF VALVE

Filed Oct. 21, 1965

INVENTOR.
CARL J. GEYER

BY Schmieding & Fultz
ATTORNEYS

United States Patent Office 3,392,748
Patented July 16, 1968

3,392,748
TAMPER-PROOF VALVE
Carl J. Geyer, Harbor Hills, Ohio, assignor to The Lattimer-Stevens Company, Columbus, Ohio, a corporation of Ohio
Filed Oct. 21, 1965, Ser. No. 500,080
4 Claims. (Cl. 137—382)

The present invention relates generally to valves and particularly to a novel tamper-proof valve construction.

In general, the valve construction of the present invention comprises a valve housing provided with a tapered bore, an inlet, an outlet, and a recess communicating with one end of said bore. A valve member is rotatably mounted through said recess into said bore and a novel cap means is non-removably inserted in said recess in a manner which prevents tampering with the valve after assembly is complete.

In accordance with the present invention, the novel valve construction incorporates a cap or cover which after assembly is non-removable and thereby prevents tampering with the valve by any outside agency, such as unskilled persons. This is extremely important in circumstances where a piping system is exposed to unskilled persons who may attempt to tamper with the valve.

For example, the piping located in the average home which conducts natural gas is exposed to adults who may tamper with a valve instead of calling on skilled persons to solve whatever problem may exist. Further, such a valve may also be exposed to children at play.

As another aspect of the present invention, the novel cap means eliminates leakage from the larger end of the tapered bore in which the valve stopcock member is disposed.

As another aspect of the present invention, the novel cap means also functions as a spring retainer when a spring is employed to bias the valve plug or stopcock member into a tighter fit with the tapered bore in the valve housing.

It is therefore a primary object to provide a novel valve construction which is completely tamperproof and prevents disassembling the valve by any other method than completely destroying the cap means by cutting or the like.

It is another object of the present invention to provide a novel valve construction in which the cap means seals the valve stopcock or plug member from the atmosphere to eliminate leakage.

It is another object of the present invention to provide a novel valve construction in which the cap means also functions as a spring retainer for a spring which biases the stopcock member into a sealed fit with the bore in the valve housing.

It is still another object of the present invention to provide a novel valve construction which lends itself to simple and economical manufacture and fabrication.

Further objects and advantages of the present invention will be apparent from the following description, reference being had to the accompanying drawings wherein a preferred form of embodiment of the invention is clearly shown.

Figure 2:
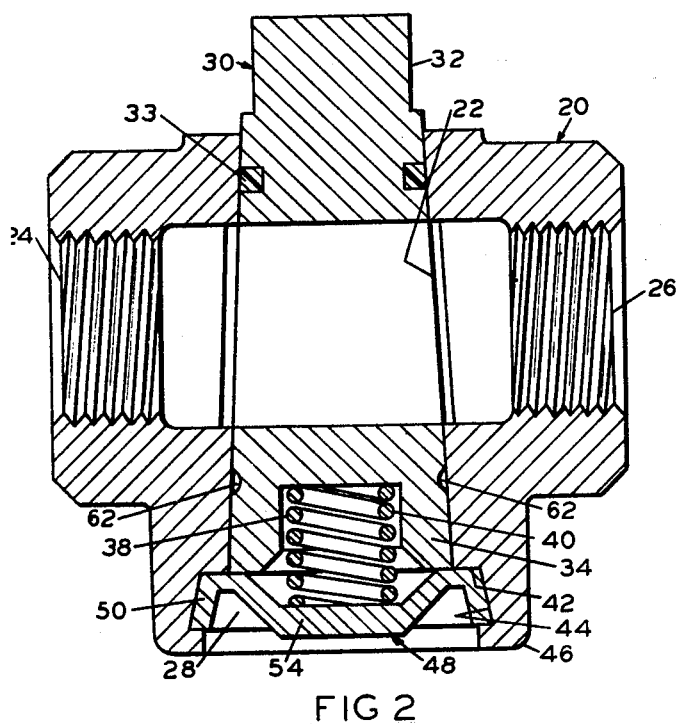
Figure 3:
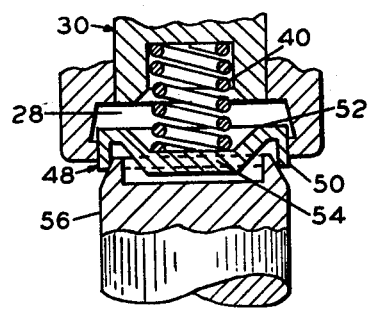

In the drawings:
FIG. 1 is a front elevational view partially in section of a valve constructed in accordance with the present invention;
FIG. 2 is a side sectional view of the valve shown in FIG. 1; and FIG. 3 is a side sectional view of a portion of the valve shown in FIG. 1 illustrating the insertion of the novel cap means by means of an expanding punch.

Referring in detail to the drawings, a valve constructed in accordance with the present invention is illustrated in FIG. 1 and includes a housing, indicated generally at 20.

As best seen in FIG. 2 housing 20 includes a tapered cylindrical bore 22, an inlet 24, an outlet 26 and a recess 28. Inlet 24, outlet 26 and recess 28 all communicate with bore 22.

A tapered cylindrical valve member, indicated generally at 30, in the form of a plug or conventional stopcock is inserted through recess 28 and rotatably mounted in bore 22 and includes an end portion 32 which protrudes out of housing 20 to provide means for manually rotating member 30.

An annular resilient seal 33 is provided toward the upper end of member 30 to prevent leakage from the upper end of bore 22. The opposite and larger end portion 34 of valve member 30 is completely inserted within bore 22 and includes a countersunk bore 38 which partially houses a coil spring 40 which urges member 30 upwardly into bore 22.

As best seen in FIG. 1, valve member 30 also includes passage means 41 which connects inlet 24 to outlet 26 upon rotation of member 30 in the manner of a conventional valve stopcock.

Referring again to FIGS. 2 and 3, recess 28 includes a shoulder 42, a tapered side wall 44 and an inturned flange portion 46.

After valve member 30 has been inserted into bore 22 and spring 40 is mounted in bore 38 a cap means, indicated generally at 48, is mounted within recess 28.

Cap means 48 includes an outer flange portion 50, a shoulder 52 and a central flange portion 54 which also functions as a spring retainer for spring 40.

With continued reference to FIGS. 2 and 3, a flange portion 50 is preferably formed of a malleable metal such as brass for example and is expandable upon mounting cap means 48. Before assembly, flange portion 50 is substantially vertically as seen in FIG. 3 and placed in position over recess 28. An expanding punch 56 then is operated to force cap means 48 into recess 28 until shoulder 52 rests against shoulder 42 of recess 28. Simultaneously flange portion 50 is radially expanded into sealed relationship with side walls 44 of recess 28 and in underlying locking relationship with inturned flange portion 46 of housing 20. The lower end of spring 40 rests on central flange portion 54 and is compressed for biasing valve member 30 into a tighter fit within bore 22.

It is important to point out that cap means 48 provides an effective seal to eliminate leakage from the bottom of valve housing 20.

Referring again to FIG. 1, a lubricating port 60 and lubricating passages 62 may be provided in housing 20 to permit periodic lubrication of bore 22 after assembly and thereby promote easier operation of valve member 30.

I claim:
1. In a valve construction the combination of a housing comprising, a bore including an inner wall and an open lower end, said housing including an annular recess in said inner wall adjacent said open lower end; a valve member rotatably mounted in said bore for controlling the flow through said housing and including a lower end inwardly of said annular recess; and an expanded cap means mounted in said recess and forming a tamper- proof closure for said open lower end, said cap means including a central flange portion spaced from said lower end of said valve member, an outwardly inclined intermediate flange portion, and a peripheral flange portion expanded into said recess, the edges of said peripheral flange portion being inaccessably covered by said housing.

2. The valve construction defined in claim 1 wherein said lower end of said valve member rotatably engages an inner surface of said cap means.

3. The valve construction defined in claim 1 wherein said lower end of said valve member and said cap means form confronting spring retaining recesses; and compression spring means mounted in said recesses.

4. The valve construction defined in claim 1 wherein said annular recess includes an outwardly tapered inner surface, and said peripheral flange portion includes an outwardly tapered outer surface extending along said inner surface.

References Cited

UNITED STATES PATENTS

| | | | |
|---|---|---|---|
| 491,469 | 2/1893 | Carver | 251—181 X |
| 2,796,079 | 6/1957 | Hugg | 137—454.6 X |
| 3,079,675 | 3/1963 | Bradbury | 251—183 X |

FOREIGN PATENTS 1,290,221  3/1962  France.

CLARENCE R. GORDON, *Primary Examiner.*